(12) United States Patent  
Liu et al.

(10) Patent No.: US 10,984,313 B2  
(45) Date of Patent: Apr. 20, 2021

(54) MULTIPLY-ACCUMULATE CALCULATION METHOD AND CIRCUIT SUITABLE FOR NEURAL NETWORK

(71) Applicant: Southeast University, Jiangsu (CN)

(72) Inventors: Bo Liu, Jiangsu (CN); Yu Gong, Jiangsu (CN); Wei Ge, Jiangsu (CN); Jun Yang, Jiangsu (CN); Longxing Shi, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 16/757,421

(22) PCT Filed: Jan. 24, 2019

(86) PCT No.: PCT/CN2019/072892  
§ 371 (c)(1),  
(2) Date: Apr. 20, 2020

(87) PCT Pub. No.: WO2020/029551  
PCT Pub. Date: Feb. 13, 2020

(65) Prior Publication Data  
US 2020/0342295 A1 Oct. 29, 2020

(30) Foreign Application Priority Data  
Aug. 8, 2018 (CN) .......................... 201810894109.2

(51) Int. Cl.  
*G06N 3/063* (2006.01)  
*G06F 7/50* (2006.01)  
(Continued)

(52) U.S. Cl.  
CPC .............. *G06N 3/063* (2013.01); *G06F 7/50* (2013.01); *G06F 7/523* (2013.01); *G06F 7/5443* (2013.01); *G06N 3/08* (2013.01)

(58) Field of Classification Search  
CPC .. G06N 3/08; G06N 3/068; G06F 7/50; G06F 7/523; G06F 7/5443  
See application file for complete search history.

(56) References Cited

U.S. PATENT DOCUMENTS 5,091,864 A * 2/1992 Baji ........................ G06N 3/063  
706/42  
5,216,751 A * 6/1993 Gardner ................. G06N 3/063  
706/42  
(Continued)

FOREIGN PATENT DOCUMENTS

CN 107341544 11/2017  
CN 107402905 11/2017  
(Continued)

OTHER PUBLICATIONS

"International Search Report (Form PCT/ISA/210) of PCT/CN2019/072892", dated Mar. 21, 2019, with English translation thereof, pp. 1-4.

*Primary Examiner* — Michael D. Yaary  
(74) *Attorney, Agent, or Firm* — JCIPRNET

(57) ABSTRACT

The present invention relates to the field of analog integrated circuits, and provides a multiply-accumulate calculation method and circuit suitable for a neural network, which realizes large-scale multiply-accumulate calculation of the neural network with low power consumption and high speed. The multiply-accumulate calculation circuit comprises a multiplication calculation circuit array and an accumulation calculation circuit. The multiplication calculation circuit array is composed of M groups of multiplication calculation circuits. Each group of multiplication calculation circuits is composed of one multiplication array unit and eight selection-shift units. The order of the multiplication array unit is quantized in real time by using on-chip training to provide a shared input for the selection-shift units, achiev- (Continued)

ing increased operating rate and reduced power consumption. The accumulation calculation circuit is composed of a delay accumulation circuit, a TDC conversion circuit, and a shift-addition circuit in series. The delay accumulation circuit comprises eight controllable delay chains for dynamically controlling the number of iterations and accumulating data multiple times in a time domain, so as to meet the difference in calculation scale of different network layers, save hardware storage space, reduce calculation complexity, and reduce data scheduling.

9 Claims, 4 Drawing Sheets

(51) Int. Cl.
  *G06F 7/523* (2006.01)
  *G06F 7/544* (2006.01)
  *G06N 3/08* (2006.01)

(56) References Cited

U.S. PATENT DOCUMENTS

| | | | |
|---|---|---|---|
| 9,818,059 B1 * | 11/2017 | Woo | G06F 9/3824 |
| 2018/0046900 A1 * | 2/2018 | Dally | G06N 3/0427 |

FOREIGN PATENT DOCUMENTS

| | | |
|---|---|---|
| CN | 107797962 | 3/2018 |
| CN | 107818367 | 3/2018 |
| CN | 107844826 | 3/2018 |

\* cited by examiner

MULTIPLY-ACCUMULATE CALCULATION METHOD AND CIRCUIT SUITABLE FOR NEURAL NETWORK

CROSS-REFERENCE TO RELATED APPLICATION

This application is a 371 of international application of PCT application serial no. PCT/CN2019/072892, filed on Jan. 24, 2019, which claims the priority benefit of China application no. 201810894109.2, filed on Aug. 8, 2018. The entirety of each of the above mentioned patent applications is hereby incorporated by reference herein and made a part of this specification.

BACKGROUND OF THE INVENTION

Field of the Invention

The present invention relates to the field of analog integrated circuits, and in particular, to a multiply-accumulate calculation method and circuit suitable for a neural network.

Description of Related Art

A neural network is an operational model consisting of a large number of nodes connected to each other. Each node represents an excitation function, and the connection between every two nodes represents a weight. The output of an artificial neural network varies depending on the connection mode, the weight value, and the excitation function of the network. In recent years, artificial neural networks and deep learning have made great progress. A neural network has a potential of quickly handling certain tasks due to its large planning parallelism, and thus shows good intelligence characteristics in the fields of pattern recognition, intelligent robots, automatic control, predictive estimation, biology, medicine, economics etc.

With the extensive application of neural networks in various fields, the problems to be solved are more and more complicated. The neural network has a large number of complex and parallel multiply-accumulate operations, which consumes a large amount of computing resources. Conventionally, a computer is generally used to perform offline processing and analysis on data. Such a data processing mode limits the application of neural networks in real-time systems to a large extent. Taking the most commonly used convolutional neural network as an example, there are a large number of multiply-accumulate operations in one operation. The conventional digital operation method has the problems such as large occupied area and high power consumption as the number of multiplier bits increases during implementation of the multiplication operation. Therefore, provided is a multiply-accumulate method suitable for a neural network, which is of great significance to complete large-scale multiply-accumulate calculation tasks in neural networks on the premise of satisfying low power consumption and high speed of hardware resources.

SUMMARY OF THE INVENTION

The technical problem to be solved by the present invention is to provide a multiply-accumulate calculation method and circuit suitable for a neural network, to meet the calculation scale and accuracy requirements of the neural network, and to realize calculation task in low power consumption and high speed.

To solve the foregoing technical problems, the present invention adopts the following technical solutions.

In one aspect, provided is a multiply-accumulate calculation circuit suitable for a neural network, comprising a multiplication calculation circuit array and an accumulation calculation circuit.

The multiplication calculation circuit array is formed by cascading M groups of multiplication calculation circuits of the same structure. Each group of multiplication calculation circuits is used to multiply input data of the neural network by a weight coefficient of the neural network, and input data of each bit of the obtained product into the accumulation calculation circuit in sequence.

The accumulation calculation circuit is configured to accumulate data of each bit of each group of products output by the multiplication calculation circuit array in a time domain, convert the obtained time quantization result into a digital quantity via a TDC circuit, and perform a shift-addition operation to obtain output data of the neural network.

The multiplication calculation circuit array has 2M groups of input ends and M groups of output ends. The accumulation calculation circuit has M groups of input ends and one group of output ends. The M groups of input ends of the accumulation calculation circuit are correspondingly connected to the M groups of output ends of the multiplication calculation circuit array, respectively.

Each group of multiplication calculation circuits has two groups of input ends and one group of output ends. Groups of input data of the neural network are sent to the first input ends of each group of multiplication calculation circuits, respectively. Groups of weight coefficients of the neural network are sent to the second input ends of each group of multiplication calculation circuits, respectively. The output data of the neural network is sent from the output end of the accumulation calculation circuit.

M-th input data, which is one piece of 8-bit data, is input to a first input end of an m-th group of multiplication calculation circuits. An m-th group of weight coefficients is input to a second input end of the m-th group of multiplication calculation circuits, the m-th group of weight coefficients comprising eight pieces of 8-bit data, which are an m-th group of first weight coefficients, an m-th group of second weight coefficients, an m-th group of third weight coefficients, an m-th group of fourth weight coefficients, an m-th group of fifth weight coefficients, an m-th group of sixth weight coefficients, an m-th group of seventh weight coefficients, and an m-th group of eighth weight coefficients, respectively. An m-th group of products is output from an output end of the m-th group of multiplication calculation circuits, the m-th group of products comprising eight groups of data, which are an m-th group of first products, an m-th group of second products, an m-th group of third products, an m-th group of fourth products, an m-th group of fifth products, an m-th group of sixth products, an m-th group of seventh products, and an m-th group of eighth products, respectively. The m-th group of first products to the m-th group of eighth products all comprise eight pieces of 1-bit data. Eight pieces of 8-bit data are output from the output end of the accumulation calculation circuit.

Further, each group of multiplication calculation circuits is composed of one group of multiplication array units and eight groups of mutually independent selection-shift units. The multiplication array unit is configured to multiply input data of the neural network by a feature multiplier to obtain a feature product. The selection-shift unit performs selection and shift operations on the feature product according to a weight coefficient of the neural network to obtain a product of the input data of the neural network and the weight coefficient of the neural network, and sequentially inputs data on each bit of the obtained product into the accumulation calculation circuit.

The eight groups of selection-shift units comprise a first selection-shift unit, a second selection-shift unit, a third selection-shift unit, a fourth selection-shift unit, a fifth selection-shift unit, a sixth selection-shift unit, a seventh selection-shift unit, and an eighth selection-shift unit.

The multiplication array unit has one group of input ends and one group of output ends. Each group of selection-shift units has two groups of input ends and one group of output ends. An input end of the multiplication array unit is connected to the first input end of the multiplication calculation circuit. An output end of the multiplication array unit forms a shared connection with a first input end of each group of selection-shift units. A second input end of each group of selection-shift units is connected to the second input end of the multiplication calculation circuit, respectively. An output end of each group of selection-shift units is connected to the output end of the multiplication calculation circuit, respectively.

The multiplication array unit outputs n feature products, and each feature product is one piece of 8-bit data, wherein n is 8, 4, 2, or 1. The n feature products serve as shared input data of the first to eighth selection-shift units to be input to the first input ends of the first to eighth selection-shift units. The first to eighth weight coefficients are correspondingly input to the second input ends of the first to eighth selection-shift units in sequence. The data on each bit of the first to eighth products is respectively output by the first to eighth selection-shift units in sequence.

Further, the multiplication array unit is composed of 8, 4, 2, or 1 calculation subunit, respectively called an eighth-order quantized multiplication array unit, a fourth-order quantized multiplication array unit, a second-order quantized multiplication array unit, and a first-order quantized multiplication array unit.

Feature multipliers of the eighth-order quantized multiplication array unit are 1, 3, 5, 7, 9, 11, 13, and 15, respectively. Feature multipliers of the fourth-order quantized multiplication array unit are 1, 3, 5, and 7, respectively. Feature multipliers of the second-order quantized multiplication array unit are 1 and 3, respectively. A feature multiplier of the first-order quantized multiplication array unit is 1.

Feature products of the eighth-order quantized multiplication array unit are 1×Input, 3×Input, 5×Input, 7×Input, 9×Input, 11×Input, 13×Input, and 15×Input. Feature products of the fourth-order quantized multiplication array unit are 1×Input, 3×Input, 5×Input, and 7×Input. Feature products of the second-order quantized multiplication array unit are 1×Input and 3×Input. A feature product of the first-order quantized multiplication array unit is 1×Input.

Further, the accumulation calculation circuit is composed of a delay accumulation circuit, a TDC conversion circuit, and a shift-addition circuit sequentially connected in series. The delay accumulation circuit has M groups of input ends and eight groups of output ends. The TDC conversion circuit has eight groups of input ends and eight groups of output ends. The shift-addition circuit has eight groups of input ends and one group of output ends. The M groups of input ends of the delay accumulation circuit are connected to the M groups of output ends of the multiplication calculation circuit array, respectively. The eight groups of output ends of the delay accumulation circuit are connected to the eight groups of input ends of the TDC conversion circuit, respectively. The eight groups of output ends of the TDC conversion circuit are connected to the eight groups of input ends of the shift-addition circuit, respectively. The output end of the shift-addition circuit is the output end of the accumulation calculation circuit.

Further, the delay accumulation circuit is a summation array composed of eight independent controllable delay chains. The number of the controllable delay chains is equal to the number of bits of an output product of the multiplication calculation circuit array. Any of the controllable delay chains completes one accumulation of data on a certain bit of the M groups of products in a time domain.

Each controllable delay chain is formed by sequentially connecting M controllable delay blocks in series. Trigger signals of the controllable delay blocks at odd locations are a clock rising edge. Trigger signals of the controllable delay blocks at even locations are a clock falling edge. Each controllable delay block has two input ends. The first input end is used to receive a time reference signal, and the second input end is respectively connected to the M groups of input ends of the delay accumulation circuit for receiving data on a certain bit of the M groups of products. Each controllable delay block has one output end for outputting a time signal after a delay amount is superimposed.

In another aspect, provided is a multiply-accumulate calculation method suitable for a neural network, which is implemented by means of the multiply-accumulate calculation circuit described above. The multiply-accumulate calculation method comprises a multiplication calculation method and an accumulation calculation method, and comprises the following steps:

step 101: performing real-time quantization on the order of multiplication array units in each group of multiplication calculation circuits in an on-chip training mode, and performing actual calculation of a neural network by using an n-th order quantized multiplication array unit;

step 102: providing, in each group of multiplication calculation circuits, by the n-th order quantized multiplication array unit, n feature products to first to eighth selection-shift units as a shared input;

step 103: comparing, in a calculation period in each group of multiplication calculation circuits, by each selection-shift unit, a decimal value of the upper four digits of the weight coefficient and a decimal value of the lower four digits of the weight coefficient with a feature multiplier of the n-th order quantized multiplication array unit respectively, and outputting each group of products, specifically as follows:

step 103-A: when the decimal value of the upper four digits of the weight coefficient is consistent with the feature multiplier and is not 0, directly outputting data of each bit of the corresponding feature product; when the decimal value of the lower four digits of the weight coefficient is consistent with the feature multiplier and is not 0, selecting a corresponding feature product, and directly outputting data of each bit of the corresponding feature product; and proceeding to step 104;

step 103-B: when the decimal value of the upper four digits of the weight coefficient is inconsistent with the feature multiplier and is not 0, performing a shift operation on the feature product, and outputting the data of each bit of the obtained result; when the decimal value of the lower four digits of the weight coefficient is inconsistent with the feature multiplier and is not 0, performing a shift operation on the feature product, and outputting the data of each bit of the obtained result; and proceeding to step 104; and step 103-C: when the decimal value of the upper four digits of the weight coefficient is 0, directly outputting 0; when the decimal value of the lower four digits of the weight coefficient is 0, directly outputting 0; and proceeding to step 104;

step 104: sequentially inputting data on the i bit in the first to M-th groups of products into M controllable delay blocks of the (i+1)-th delay chain, wherein i is any natural number from 0 to 7;

wherein at a trigger signal moment, the controllable delay block outputs different delay amounts according to different values of the input data, specifically as follows: the controllable delay block outputs a delay amount $\Delta t$ when the input data is 0, and the controllable delay block outputs a delay amount $2\Delta t$ when the input data is 1; and at a non-trigger signal moment, the controllable delay block outputs a delay amount $\Delta t$, regardless of the input data of 0 or 1;

step 105: completing, by the (i+1)-th controllable delay chain, one accumulation of data on the i bit in the first to M-th groups of products in a time domain; and when the calculation scale of the neural network exceeds the cascade number M of the controllable delay blocks, dynamically controlling the number of iterations of each controllable delay chain;

step 106: converting the delay amount output by each controllable delay chain into a decimal digital quantity by using a TDC conversion circuit; and step 107: performing addition and right-shift operations on the digital quantity by using a shift-addition circuit to obtain output data of the neural network.

Further, in each group of multiplication calculation circuits, the specific steps of the on-chip training mode are as follows:

step 201: initializing a weight coefficient of the neural network, setting a training data set, and obtaining a pre-trained neural network $NN_0$;

step 202: comprising two simultaneous parts, specifically as follows:

step 202-A: testing the pre-trained neural network $NN_0$ with a testing data set to obtain network initial accuracy A; and step 202-B: initializing the quantization order of the multiplication array unit to a first order, and replacing a standard multiplication calculation circuit in the pre-trained neural network $NN_0$ with a first-order quantized multiplication calculation circuit to obtain a first-order quantized neural network $NN_1$; and training the first-order quantized neural network $NN_1$ with the testing data set to obtain network actual accuracy B;

step 203: introducing a limiting factor Q of network accuracy, and determining the size relationship between B and A×Q; if B>A×Q, then proceeding to step 209; and if B<A×Q, then proceeding to step 204;

step 204: increasing the quantization order of the multiplication array unit to a second order, and replacing the standard multiplication calculation circuit in the pre-trained neural network $NN_0$ with a second-order quantized multiplication calculation circuit to obtain a second-order quantized neural network $NN_2$; and training the second-order quantized neural network $NN_2$ with the testing data set to obtain network actual accuracy B;

step 205: introducing a limiting factor Q of network accuracy, and determining the size relationship between B and A×Q; if B>A×Q, then proceeding to step 209; and if B<A×Q, then proceeding to step 206;

step 206: increasing the quantization order of the multiplication array unit to a fourth order, and replacing the standard multiplication calculation circuit in the pre-trained neural network $NN_0$ with a fourth-order quantized multiplication calculation circuit to obtain a fourth-order quantized neural network $NN_4$; and training the fourth-order quantized neural network $NN_4$ with the testing data set to obtain network actual accuracy B;

step 207: introducing a limiting factor Q of network accuracy, and determining the size relationship between B and A×Q; if B>A×Q, then proceeding to step 209; and if B<A×Q, then proceeding to step 208;

step 208: increasing the quantization order of the multiplication array unit to an eighth order, and replacing the standard multiplication calculation circuit in the pre-trained neural network $NN_0$ with an eighth-order quantized multiplication calculation circuit to obtain an eighth-order quantized neural network $NN_8$, and proceeding to step 209; and step 209: ending the on-chip training of the quantization order of the multiplication array unit, and performing actual calculation on the neural network by using the multiplication array unit of the current quantization order.

Further, in each group of multiplication calculation circuits, the shift operation is performed on the feature product in step 103-B according to the quantization order of the multiplication array unit, specifically as follows:

when the quantization order of the multiplication array unit is eighth: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 5×Input is shifted to the left by 1 bit to obtain 10×Input; the feature product 3×Input is shifted to the left by 2 bits to obtain 12×Input; and the feature product 7×Input is shifted to the left by 1 bit to obtain 14×Input;

when the quantization order of the multiplication array unit is fourth: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 3×Input is shifted to the left by 2 bits to obtain 12×Input; the feature product 1×Input is shifted to the left by 2 bits to obtain 4×Input, approximately representing 5×Input; the feature product 3×Input is shifted to the left by 1 bit to obtain 6×Input, approximately representing 7×Input; the feature product 1×Input is shifted to the left by 3 bits to obtain 8×Input, approximately representing 9×Input and 10×Input; and the feature product 3×Input is shifted to the left by 2 bits to obtain 12×Input, approximately representing 11×Input, 13×Input, 14×Input, and 15×Input;

when the quantization order of the multiplication array unit is second: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 3×Input is shifted to the left by 2 bits to obtain 12×Input; the feature product 1×Input is shifted to the left by 2 bits to obtain 4×Input, approximately representing 5×Input; the feature product 3×Input is shifted to the left by 1 bit to obtain 6×Input, approximately representing 7×Input; the feature product 1×Input is shifted to the left by 3 bits to obtain 8×Input, approximately representing 9×Input and 10×Input; and the feature product 3×Input is shifted to the left by 2 bits to obtain 12×Input, approximately representing 11×Input, 13×Input, 14×Input, and 15×Input; and when the quantization order of the multiplication array unit is first: the feature product 1×Input is shifted to the left by 1 bit to obtain 2×Input; the feature product 1×Input is shifted to the left by 2 bits to obtain 4×Input; the feature product 1×Input is shifted to the left by 3 bits to obtain 8×Input; the feature product 1×Input is shifted to the left by 1 bit to obtain 2×Input, approximately representing 3×Input; the feature product 1×Input is shifted to the left by 2 bits to obtain 4×Input, approximately representing 5×Input, 6×Input, and 7×Input; and the feature product 1×Input is shifted to the left by 3 bits to obtain 8×Input, approximately representing 9×Input, 10×Input, 11×Input, 12×Input, 13×Input, 14×Input, and 15×Input.

Further, the dynamically controlling the number of iterations of each controllable delay chain in step 105 comprises the following specific steps:

step 301: if the calculation scale of the neural network is W, dividing W groups of data into K segments of M groups of data and one segment of N groups of data, wherein K is an integer greater than or equal to 1, and N is an integer greater than or equal to 1 and less than M;

step 302: taking a time signal $Y_{j-1}$ as an input; performing, by each controllable delay chain, a j-th accumulative calculation on the j-th segment of M groups of data, and outputting a time quantity $Y_j=Y_{j-1}+\Delta T_j$, wherein j is a natural number from 1 to K; and step 303: taking a time signal $Y_K$ as an input; and performing, by each controllable delay chain, an accumulative calculation on the N groups of data, and outputting a time quantity $Y=Y_k+\Delta T$.

Compared with the prior art, the technical solutions of the present invention have the following technical effects.

1. For different calculation scales and accuracy requirements of the neural networks, a multiply-accumulate calculation method is provided. The quantization order of the multiplication array unit is dynamically adjusted in real time in an on-chip training mode, and the current n-th order quantized multiplication array unit is used for the actual calculation of the neural network, so that the accuracy and power consumption are optimized.

2. In each group of multiplication calculation circuits, eight groups of selection-shift units share the output of one group of multiplication array units. Therefore, in the same calculation cycle, the eight groups of selection-shift units can simultaneously perform multiplication calculations, significantly improving the operation rate of the circuit. In addition, each group of multiplication calculation circuits has only one group of multiplication array units, thus significantly reducing the power consumption of the multiplication circuit and improving the circuit throughput compared with the prior art.

3. The delay accumulation circuit is a summation array constructed by controllable delay chains. The delay signals are superimposable. Therefore, the number of iterations of the summation array, i.e., the number of iterations of each controllable delay chain is dynamically adjusted according to the calculation scale of each layer of the neural network, so as to meet the differences in calculation scales of different network layers, save hardware storage space, reduce computational complexity, and reduce data scheduling.

4. In the delay accumulation circuit, the digital quantity is directly converted into the time quantity for the accumulation operation, and digital conversion is performed on the final time quantity by means of the TDC circuit after the desired number of iterations is completed. All accumulation processes are completed in the time domain, eliminating the influence of non-ideal effects of the external circuit. The complexity of the circuit can be reduced while ensuring the accumulation accuracy, so that the circuit is easy to implement. In addition, the circuit conversion in the time domain is fast in speed and high in efficiency, so that the delay accumulation circuit operates in a low-power consumption and high-speed environment, which satisfies the requirements in practical applications.

DETAILED DESCRIPTION OF THE INVENTION

Embodiment 1

Figure 1:
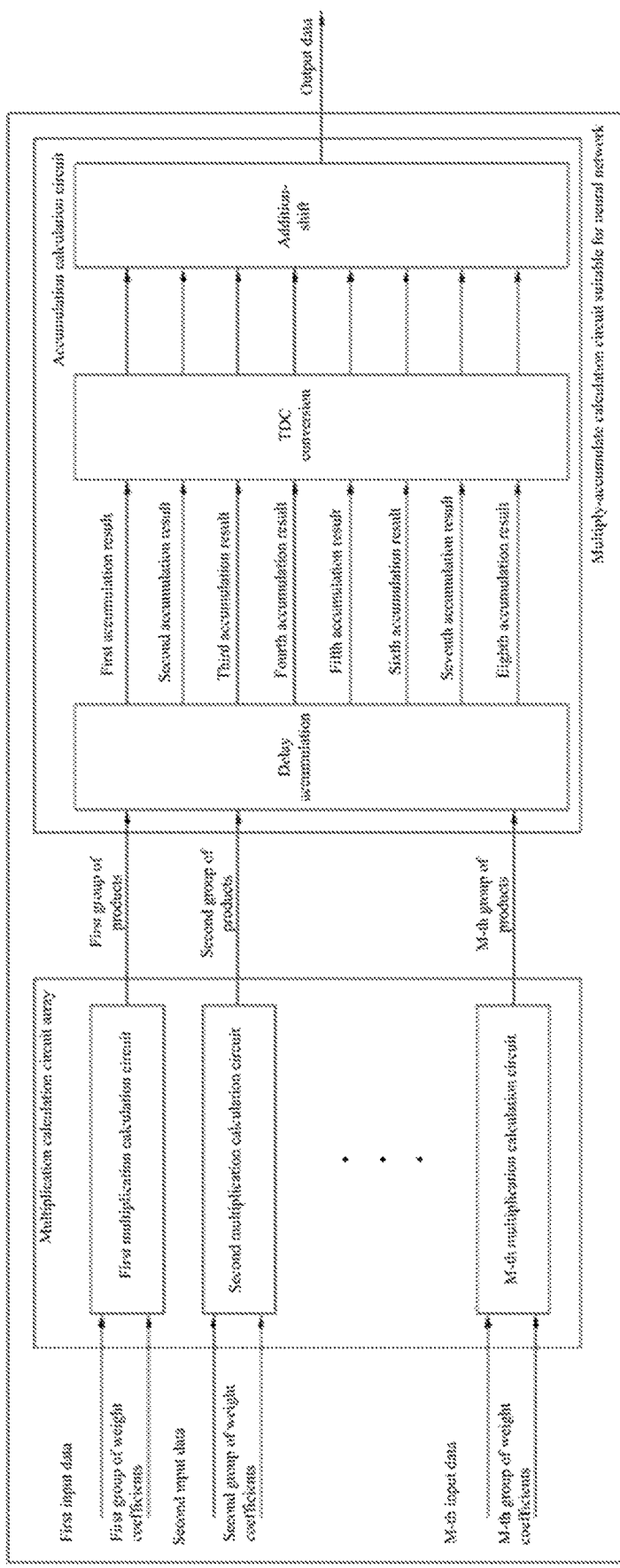
FIG. 1 is a schematic block diagram of a multiply-accumulate calculation circuit suitable for a neural network according to the present invention.

FIG. 1 is a schematic block diagram of a multiply-accumulate calculation circuit suitable for a neural network according to the present invention. The multiply-accumulate calculation circuit shown in the figure comprises a multiplication calculation circuit array and an accumulation calculation circuit.

The multiplication calculation circuit array is formed by cascading M groups of multiplication calculation circuits of the same structure. Each group of multiplication calculation circuits is used to multiply input data of the neural network by a weight coefficient of the neural network, and input data of each bit of the obtained product into the accumulation calculation circuit in sequence.

The accumulation calculation circuit is configured to accumulate data of each bit of each group of products output by the multiplication calculation circuit array in a time domain, convert the obtained time quantization result into a digital quantity via a TDC circuit, and perform a shift-addition operation to obtain output data of the neural network.

The multiplication calculation circuit array has 2M groups of input ends and M groups of output ends. The accumulation calculation circuit has M groups of input ends and one group of output ends. The M groups of input ends of the accumulation calculation circuit are correspondingly connected to the M groups of output ends of the multiplication calculation circuit array, respectively.

Each group of multiplication calculation circuits has two groups of input ends and one group of output ends. Groups of input data of the neural network are sent to the first input ends of each group of multiplication calculation circuits, respectively. Groups of weight coefficients of the neural network are sent to the second input ends of each group of multiplication calculation circuits, respectively. The output data of the neural network is sent from the output end of the accumulation calculation circuit.

The accumulation calculation circuit is composed of a delay accumulation circuit, a TDC conversion circuit, and a shift-addition circuit sequentially connected in series. The delay accumulation circuit has M groups of input ends and eight groups of output ends. The TDC conversion circuit has eight groups of input ends and eight groups of output ends. The shift-addition circuit has eight groups of input ends and one group of output ends. The M groups of input ends of the delay accumulation circuit are connected to the M groups of output ends of the multiplication calculation circuit array, respectively. The eight groups of output ends of the delay accumulation circuit are connected to the eight groups of input ends of the TDC conversion circuit, respectively. The eight groups of output ends of the TDC conversion circuit are connected to the eight groups of input ends of the shift-addition circuit, respectively. The output end of the shift-addition circuit is the output end of the accumulation calculation circuit.

This embodiment provides a detailed description of the output data of the multiplication calculation circuit in conjunction with FIG. 1, as follows.

M-th input data, which is one piece of 8-bit data, is input to a first input end of an m-th group of multiplication calculation circuits. An m-th group of weight coefficients is input to a second input end of the m-th group of multiplication calculation circuits, the m-th group of weight coefficients comprising eight pieces of 8-bit data, which are an m-th group of first weight coefficients, an m-th group of second weight coefficients, an m-th group of third weight coefficients, an m-th group of fourth weight coefficients, an m-th group of fifth weight coefficients, an m-th group of sixth weight coefficients, an m-th group of seventh weight coefficients, and an m-th group of eighth weight coefficients, respectively.

The m-th group of products is output from the output end of the m-th group of multiplication calculation circuits, the m-th group of products comprising eight groups of data, as follows:

the m-th group of first products $P_{m\text{-}1}$=the m-th input data×the m-th group of first weight coefficients;

the m-th group of second products $P_{m\text{-}2}$=the m-th input data×the m-th group of second weight coefficients;

the m-th group of third products $P_{m\text{-}3}$=the m-th input data×the m-th group of third weight coefficients;

the m-th group of fourth products $P_{m\text{-}4}$=the m-th input data×the m-th group of fourth weight coefficients;

the m-th group of fifth products $P_{m\text{-}5}$=the m-th input data×the m-th group of fifth weight coefficients;

the m-th group of sixth products $P_{m\text{-}6}$=the m-th input data×the m-th group of sixth weight coefficients;

the m-th group of seventh products $P_{m\text{-}7}$=the m-th input data×the m-th group of seventh weight coefficients; and the m-th group of eighth products $P_{m\text{-}8}$=the m-th input data×the m-th group of eighth weight coefficients.

The m-th group of first products to the m-th group of eighth products all comprise eight 1-bit data, and the m-th group of products $P_m$ is an 8×8 matrix, as follows:

$$P_m = \begin{Bmatrix} P_{m1} \\ P_{m2} \\ P_{m3} \\ P_{m4} \\ P_{m5} \\ P_{m6} \\ P_{m7} \\ P_{m8} \end{Bmatrix}$$

$$= \begin{Bmatrix} D^{[0]}_{m1} & D^{[1]}_{m1} & D^{[2]}_{m1} & D^{[3]}_{m1} & D^{[4]}_{m1} & D^{[5]}_{m1} & D^{[6]}_{m1} & D^{[7]}_{m1} \\ D^{[0]}_{m2} & D^{[1]}_{m2} & D^{[2]}_{m2} & D^{[3]}_{m2} & D^{[4]}_{m2} & D^{[5]}_{m2} & D^{[6]}_{m2} & D^{[7]}_{m2} \\ D^{[0]}_{m3} & D^{[1]}_{m3} & D^{[2]}_{m3} & D^{[3]}_{m3} & D^{[4]}_{m3} & D^{[5]}_{m3} & D^{[6]}_{m3} & D^{[7]}_{m3} \\ D^{[0]}_{m4} & D^{[1]}_{m4} & D^{[2]}_{m4} & D^{[3]}_{m4} & D^{[4]}_{m4} & D^{[5]}_{m4} & D^{[6]}_{m4} & D^{[7]}_{m4} \\ D^{[0]}_{m5} & D^{[1]}_{m5} & D^{[2]}_{m5} & D^{[3]}_{m5} & D^{[4]}_{m5} & D^{[5]}_{m5} & D^{[6]}_{m5} & D^{[7]}_{m5} \\ D^{[0]}_{m6} & D^{[1]}_{m6} & D^{[2]}_{m6} & D^{[3]}_{m6} & D^{[4]}_{m6} & D^{[5]}_{m6} & D^{[6]}_{m6} & D^{[7]}_{m6} \\ D^{[0]}_{m7} & D^{[0]}_{m7} & D^{[0]}_{m7} & D^{[0]}_{m7} & D^{[0]}_{m7} & D^{[0]}_{m7} & D^{[0]}_{m7} & D^{[0]}_{m7} \\ D^{[0]}_{m8} & D^{[1]}_{m8} & D^{[2]}_{m8} & D^{[3]}_{m8} & D^{[4]}_{m8} & D^{[5]}_{m8} & D^{[6]}_{m8} & D^{[7]}_{m8} \end{Bmatrix}$$

Embodiment 2

Figure 2:
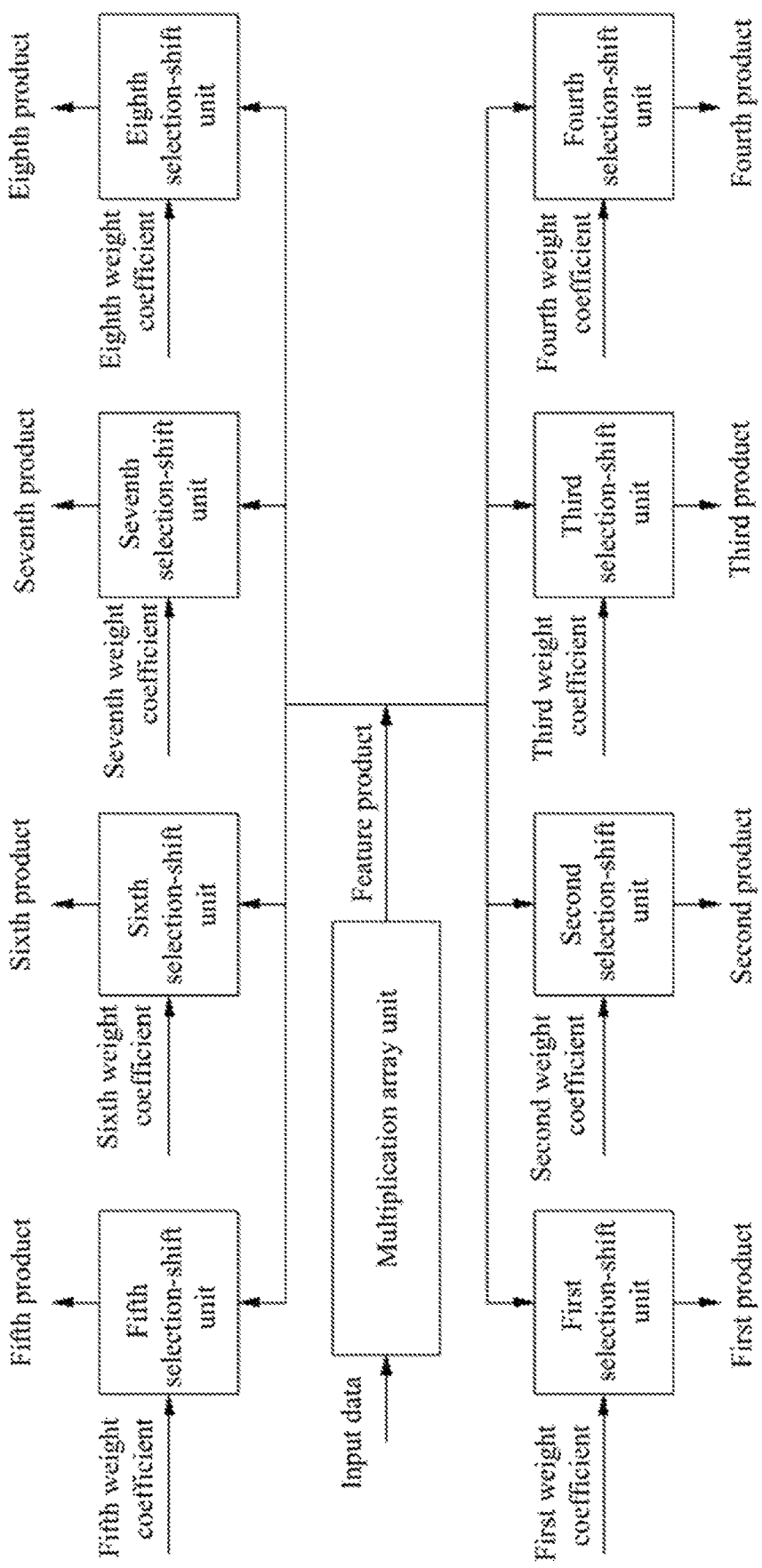
FIG. 2 is a schematic block diagram of a group of multiplication calculation circuits in a multiply-accumulate calculation circuit suitable for a neural network according to the present invention.

FIG. 2 is a schematic block diagram of a group of multiplication calculation circuits in a multiply-accumulate calculation circuit suitable for a neural network according to the present invention.

As shown in FIG. 2, each group of multiplication calculation circuits is composed of one group of multiplication array units and eight groups of mutually independent selection-shift units. The multiplication array unit is configured to multiply input data of the neural network by a feature multiplier to obtain a feature product. The selection-shift unit performs selection and shift operations on the feature product according to a weight coefficient of the neural network to obtain a product of the input data of the neural network and the weight coefficient of the neural network, and sequentially inputs data on each bit of the obtained product into the accumulation calculation circuit.

The eight groups of selection-shift units comprise a first selection-shift unit, a second selection-shift unit, a third selection-shift unit, a fourth selection-shift unit, a fifth selection-shift unit, a sixth selection-shift unit, a seventh selection-shift unit, and an eighth selection-shift unit.

The multiplication array unit has one group of input ends and one group of output ends. Each group of selection-shift units has two groups of input ends and one group of output ends. An input end of the multiplication array unit is connected to the first input end of the multiplication calculation circuit. An output end of the multiplication array unit forms a shared connection with a first input end of each group of selection-shift units. A second input end of each group of selection-shift units is connected to the second input end of the multiplication calculation circuit, respectively. An output end of each group of selection-shift units is connected to the output end of the multiplication calculation circuit, respectively.

The multiplication array unit outputs n feature products, and each feature product is one piece of 8-bit data, wherein n is 8, 4, 2, or 1. The n feature products serve as shared input data of the first to eighth selection-shift units to be input to the first input ends of the first to eighth selection-shift units. The first to eighth weight coefficients are correspondingly input to the second input ends of the first to eighth selection-shift units in sequence. The data on each bit of the first to eighth products is respectively output by the first to eighth selection-shift units in sequence.

The multiplication array unit is composed of 8, 4, 2, or 1 calculation subunit, respectively called an eighth-order quantized multiplication array unit, a fourth-order quantized multiplication array unit, a second-order quantized multiplication array unit, and a first-order quantized multiplication array unit.

Feature multipliers of the eighth-order quantized multiplication array unit are 1, 3, 5, 7, 9, 11, 13, and 15, respectively. Feature multipliers of the fourth-order quantized multiplication array unit are 1, 3, 5, and 7, respectively. Feature multipliers of the second-order quantized multiplication array unit are 1 and 3, respectively. A feature multiplier of the first-order quantized multiplication array unit is 1.

Feature products of the eighth-order quantized multiplication array unit are 1×Input, 3×Input, 5×Input, 7×Input, 9×Input, 11×Input, 13×Input, and 15×Input. Feature products of the fourth-order quantized multiplication array unit are 1×Input, 3×Input, 5×Input, and 7×Input. Feature products of the second-order quantized multiplication array unit are 1×Input and 3×Input. A feature product of the first-order quantized multiplication array unit is 1×Input.

In each group of multiplication calculation circuits, the shift operation is performed on the feature product according to the quantization order of the multiplication array unit, specifically as follows.

When the quantization order of the multiplication array unit is eighth: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 5×Input is shifted to the left by 1 bit to obtain 10×Input; the feature product 3×Input is shifted to the left by 2 bits to obtain 12×Input; and the feature product 7×Input is shifted to the left by 1 bit to obtain 14×Input.

When the quantization order of the multiplication array unit is fourth: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 3×Input is shifted to the left by 2 bits to obtain 12×Input; the feature product 1×Input is shifted to the left by 2 bits to obtain 4×Input, approximately representing 5×Input; the feature product 3×Input is shifted to the left by 1 bit to obtain 6×Input, approximately representing 7×Input; the feature product 1×Input is shifted to the left by 3 bits to obtain 8×Input, approximately representing 9×Input and 10×Input; and the feature product 3×Input is shifted to the left by 2 bits to obtain 12×Input, approximately representing 11×Input, 13×Input, 14×Input, and 15×Input.

When the quantization order of the multiplication array unit is second: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 3×Input is shifted to the left by 2 bits to obtain 12×Input; the feature product 1×Input is shifted to the left by 2 bits to obtain 4×Input, approximately representing 5×Input; the feature product 3×Input is shifted to the left by 1 bit to obtain 6×Input, approximately representing 7×Input; the feature product 1×Input is shifted to the left by 3 bits to obtain 8×Input, approximately representing 9×Input and 10×Input; and the feature product 3×Input is shifted to the left by 2 bits to obtain 12×Input, approximately representing 11×Input, 13×Input, 14×Input, and 15×Input.

When the quantization order of the multiplication array unit is first: the feature product 1×Input is shifted to the left by 1 bit to obtain 2×Input; the feature product 1×Input is shifted to the left by 2 bits to obtain 4×Input; the feature product 1×Input is shifted to the left by 3 bits to obtain 8×Input; the feature product 1×Input is shifted to the left by 1 bit to obtain 2×Input, approximately representing 3×Input; the feature product 1×Input is shifted to the left by 2 bits to obtain 4×Input, approximately representing 5×Input, 6×Input, and 7×Input; and the feature product 1×Input is shifted to the left by 3 bits to obtain 8×Input, approximately representing 9×Input, 10×Input, 11×Input, 12×Input, 13×Input, 14×Input, and 15×Input.

It can be seen from the analysis of this embodiment that the eighth-order quantized multiplication calculation circuit can accurately calculate 16 products, the fourth-order quantized multiplication calculation circuit can accurately calculate 12 products and approximately calculate 4 products, the second-order quantized multiplication calculation circuit can accurately calculate 8 products and approximately calculate 8 products, and the first-order quantized multiplication calculation circuit, which is equivalent to canceling the multiplication array structure and directly inputting the input data to the selection-shift unit, can accurately calculate 5 products and approximately calculate 11 products.

In view of the above, the more the real-time quantization orders of the multiplication arrays in the shared multiplier is, the higher the accuracy of the multiplier calculation is, but the speed is reduced and the loss is increased. In contrast, the less the quantization orders of multiplication arrays is, the lower the calculation accuracy of the multiplier is, but the power consumption is significantly reduced, and the throughput and speed of the circuit are significantly improved. Especially after the first-order real-time quantization, the shared multiplier is completely liberated, the shared multiplication array is cancelled, and the multiplication is replaced with the shift and addition method. For the application scene with less accuracy requirements, the complete liberation of the multiplier has a great advantage, the approximate calculation of multiplication with ultra-low power consumption is realized, and the working efficiency of the circuit is greatly improved.

Embodiment 3

Figure 3:
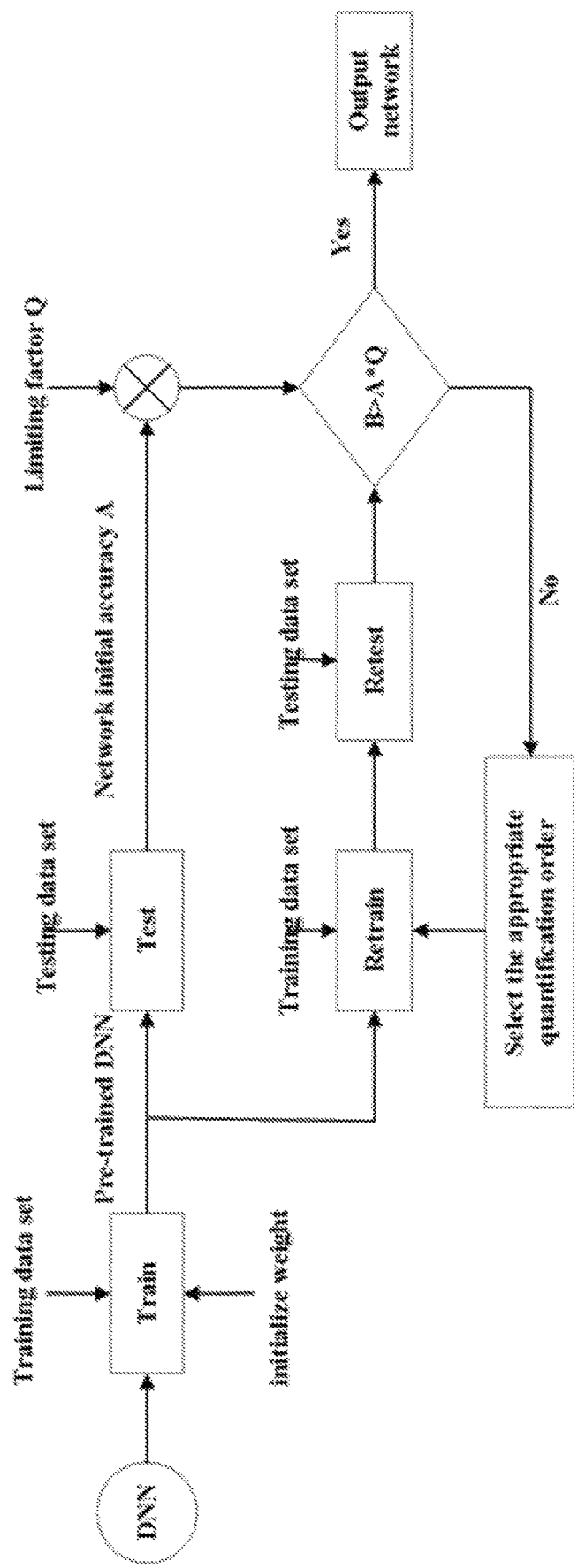
FIG. 3 is a control logic diagram of dynamically adjusting the quantization order of the multiplication array unit in real time in an on-chip training mode according to the present invention, taking a DNN network as an example.

FIG. 3 is a control logic diagram of dynamically adjusting the quantization order of the multiplication array unit in real time in an on-chip training mode according to the present invention. With reference to FIG. 3, in this embodiment, the on-chip training of the DNN is preferred, and the order of each multiplication array unit is quantized into a fourth order in an on-chip training mode, specifically as follows:

step 201: a weight coefficient of the DNN is initialized, a training data set is set, and a pre-trained DNN is obtained;

step 202: two simultaneous parts are comprised, specifically as follows:

step 202-A: the pre-trained DNN is tested with a testing data set to obtain network initial accuracy A; and step 202-B: the quantization order of the multiplication array unit is initialized to a first order, and a standard multiplication calculation circuit in the pre-trained DNN is replaced with a first-order quantized multiplication calculation circuit to obtain a $DNN_1$; and the $DNN_1$ is trained with the testing data set to obtain network actual accuracy B;

step 203: a limiting factor Q of network accuracy is introduced, and in this case, B<A×Q, then the process proceeds to step 4;

step 204: the quantization order of the multiplication array unit is increased to a second order, and a standard multiplication calculation circuit in the pre-trained DNN is replaced with a second-order quantized multiplication calculation circuit to obtain a $DNN_2$; and the $DNN_2$ is trained with the testing data set to obtain network actual accuracy B;

step 205: a limiting factor Q of network accuracy is introduced, and in this case, B<A×Q, then the process proceeds to step 6;

step 206: the quantization order of the multiplication array unit is increased to a fourth order, and a standard multiplication calculation circuit in the pre-trained DNN is replaced with a fourth-order quantized multiplication calculation circuit to obtain a $DNN_4$; and the $DNN_4$ is trained with the testing data set to obtain network actual accuracy B; and step 207: a limiting factor Q of network accuracy is introduced, and in this case, B>A×Q, then the on-chip training of the quantization order of the multiplication array unit is ended, and the actual calculation of the DNN is performed by the fourth-order quantized multiplication array unit.

Embodiment 4

Figure 4:
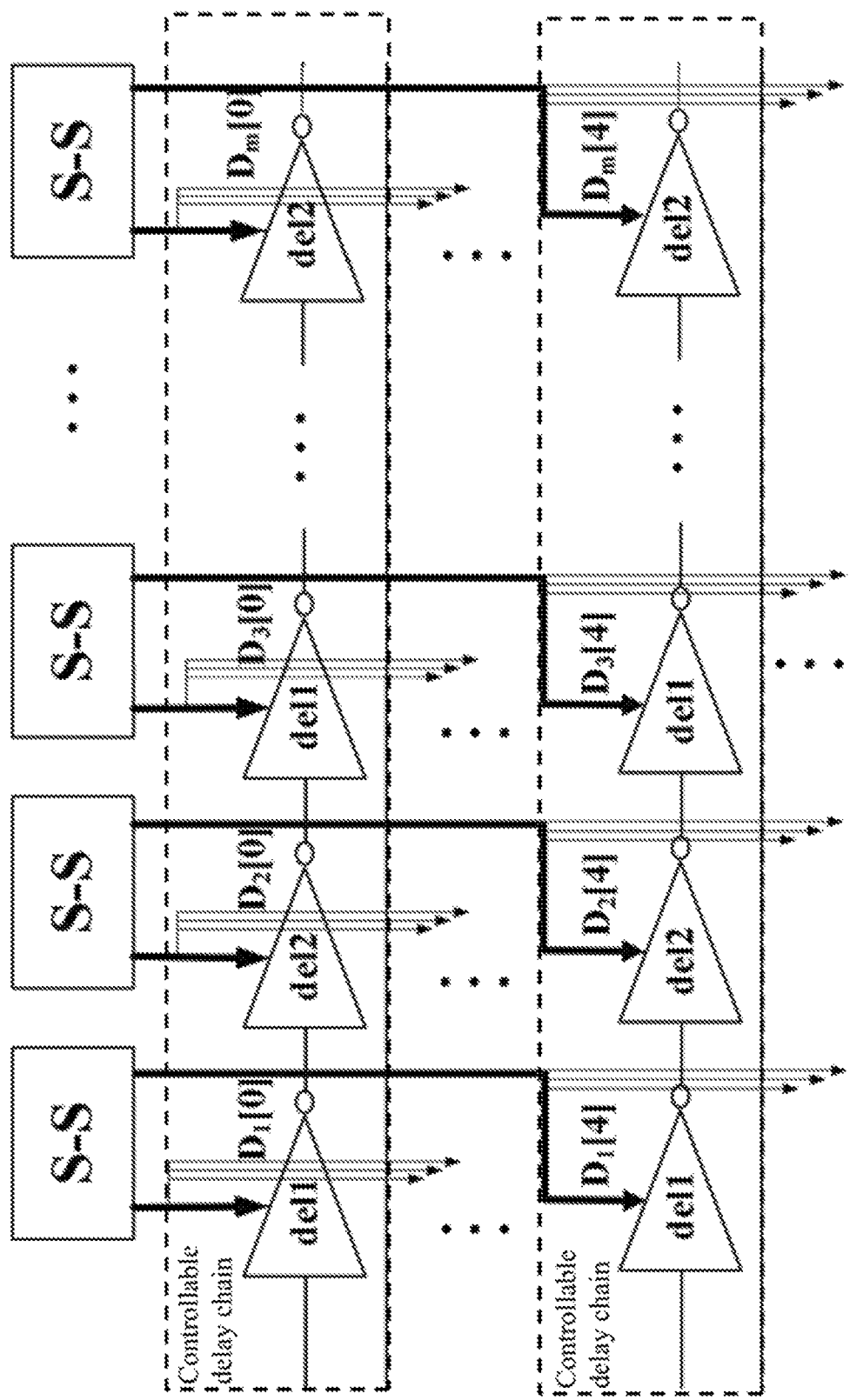
FIG. 4 is a schematic diagram of a delay accumulation circuit in a multiply-accumulate calculation circuit suitable for a neural network according to the present invention.

FIG. 4 is a schematic diagram of a delay accumulation circuit in a multiply-accumulate calculation circuit suitable for a neural network according to the present invention. With reference to FIG. 4, the delay accumulation circuit is specifically described as follows.

The delay accumulation circuit is a summation array composed of eight independent controllable delay chains. According to Embodiment 1, the number of the controllable delay chains is equal to the number of bits of an output product of the multiplication calculation circuit array.

Each controllable delay chain is formed by sequentially connecting M controllable delay blocks in series. Trigger signals of the controllable delay blocks del1 at odd locations are a clock rising edge. Trigger signals of the controllable delay blocks del2 at even locations are a clock falling edge. Each controllable delay block has two input ends. The first input end is used to receive a time reference signal, and the second input end is respectively connected to the M groups of input ends of the delay accumulation circuit for receiving data on a certain bit of the M groups of products. Each controllable delay block has one output end for outputting a time signal after a delay amount is superimposed.

At a trigger signal moment, the controllable delay block outputs different delay amounts according to different values of the input data, specifically as follows: the controllable delay block outputs a delay amount Δt when the input data is 0, and the controllable delay block outputs a delay amount 2Δt when the input data is 1. At a non-trigger signal moment, the controllable delay block outputs a delay amount Δt, regardless of the input data of 0 or 1.

Taking the fourth-order quantized multiplication calculation circuit array as an example, the accumulation process of the third controllable delay chain in the delay accumulation circuit is described in detail as follows.

The data input to the fifth controllable delay chain for accumulative calculation is the data on the 4-th bit in the first to the M-th groups of products, specifically: $D_j^{[4]} = \{D_{1j}^{[4]}, D_{2j}^{[4]}, D_{3j}^{[4]}, \ldots, D_{Mj}^{[4]}\}$, where 1≤j≤8.

The number of input data is 8M. According to the calculation scale, the number of iteration calculations of the fifth controllable delay chain is dynamically controlled to be 8.

In the first iteration, taking a time signal $Y_0$ as an input, the delay blocks on the fifth controllable delay chain sequentially input $D_1^{[4]} = \{D_{11}^{[4]}, D_{21}^{[4]}, D_{31}^{[4]}, \ldots, D_{M1}^{[4]}\}$, then the delay chain outputs a time quantity $Y_1 = Y_0 + \Delta T_1$. In the second iteration, taking a time signal $Y_1$ as an input, the delay blocks on the fifth controllable delay chain sequentially input $D_2^{[4]} = \{D_{12}^{[4]}, D_{22}^{[4]}, D_{32}^{[4]}, \ldots, D_{M2}^{[4]}\}$, then the delay chain outputs a time quantity $Y_2 = Y_2 + \Delta T_2 = Y_0 + \Delta T_1 + \Delta T_2$. After eight iterations, the fifth delay chain outputs a time quantity $$Y_8 = Y_0 + \sum_{j=1}^{8} \Delta T_j.$$

In this case, the intrinsic delay amount $T_{in}$ comprised in the output time quantity is eliminated, i.e., $$Y = Y_0 + \sum_{j=1}^{H} \Delta T_j - T_{in}.$$

After multiple iteration calculations, the fifth controllable delay chain outputs only one time delay amount $T_{delay} = Y - Y_0$. The length of the delay amount represents the number of "1"s in the input data signal.

The contents above are only part of embodiments of the present invention, and it should be noted that those of ordinary skill in the art can make several improvements and modifications, without departing from the principle of the present invention. These improvements and modifications should also be construed within the protection scope of the present invention.

What is claimed is:

1. A multiply-accumulate calculation circuit suitable for a neural network, comprising a multiplication calculation circuit array and an accumulation calculation circuit, wherein
the multiplication calculation circuit array is formed by cascading M groups of multiplication calculation circuits of the same structure; each group of multiplication calculation circuits is used to multiply input data of the neural network by a weight coefficient of the neural network, and input data of each bit of an obtained product into the accumulation calculation circuit in sequence;
the accumulation calculation circuit is configured to accumulate data of each bit of each group of products output by the multiplication calculation circuit array in a time domain, and perform analog-to-digital conversion and shift-addition operations on an obtained time quantization result to obtain output data of the neural network;
the multiplication calculation circuit array has 2M groups of input ends and M groups of output ends; the accumulation calculation circuit has M groups of input ends and one group of output ends; and the M groups of input ends of the accumulation calculation circuit are correspondingly connected to the M groups of output ends of the multiplication calculation circuit array, respectively;

m-th input data, which is one piece of 8-bit data, is input to a first input end of an m-th group of multiplication calculation circuits; an m-th group of weight coefficients is input to a second input end of the m-th group of multiplication calculation circuits, the m-th group of weight coefficients comprising eight pieces of 8-bit data, the m-th group of weight coefficients are an m-th group of first weight coefficients, an m-th group of second weight coefficients, an m-th group of third weight coefficients, an m-th group of fourth weight coefficients, an m-th group of fifth weight coefficients, an m-th group of sixth weight coefficients, an m-th group of seventh weight coefficients, and an m-th group of eighth weight coefficients, respectively; an m-th group of products is output from an output end of the m-th group of multiplication calculation circuits, the m-th group of products comprising eight groups of data, the m-th group of products are an m-th group of first products, an m-th group of second products, an m-th group of third products, an m-th group of fourth products, an m-th group of fifth products, an m-th group of sixth products, an m-th group of seventh products, and an m-th group of eighth products, respectively; the m-th group of first products to the m-th group of eighth products all comprise eight pieces of 1-bit data; n<M, M is a positive integer; the output end of the m-th group of multiplication calculation circuits is connected to the input end of the accumulation calculation circuit; and the eight pieces of 8-bit data output from the output end of the accumulation calculation circuit are output data of a neural network.

2. The multiply-accumulate calculation circuit suitable for a neural network according to claim 1, wherein each group of multiplication calculation circuits is composed of one group of multiplication array units and eight groups of mutually independent selection-shift units; the multiplication array unit is configured to multiply input data of the neural network by a feature multiplier to obtain a feature product; the selection-shift unit performs selection and shift operations on the feature product according to a weight coefficient of the neural network to obtain a product of the input data of the neural network and the weight coefficient of the neural network, and sequentially inputs data on each bit of the obtained product into the accumulation calculation circuit;

the eight groups of selection-shift units comprise a first selection-shift unit, a second selection-shift unit, a third selection-shift unit, a fourth selection-shift unit, a fifth selection-shift unit, a sixth selection-shift unit, a seventh selection-shift unit, and an eighth selection-shift unit;

an input end of the multiplication array unit is connected to the first input end of the multiplication calculation circuit; an output end of the multiplication array unit forms a shared connection with a first input end of each group of selection-shift units; a second input end of each group of selection-shift units is connected to the second input end of the multiplication calculation circuit, respectively; an output end of each group of selection-shift units is connected to the output end of the multiplication calculation circuit, respectively;

the multiplication array unit outputs n feature products, and each feature product is one piece of 8-bit data, wherein n is 8, 4, 2, or 1; the n feature products serve as shared input data of the first to eighth selection-shift units to be input to the first input ends of the first to eighth selection-shift units; the first to eighth weight coefficients are correspondingly input to the second input ends of the first to eighth selection-shift units in sequence; and the data on each bit of the first to eighth products is respectively output by the first to eighth selection-shift units in sequence.

3. The multiply-accumulate calculation circuit suitable for a neural network according to claim 2, wherein the multiplication array unit is composed of 8, 4, 2, or 1 calculation subunit, respectively called an eighth-order quantized multiplication array unit, a fourth-order quantized multiplication array unit, a second-order quantized multiplication array unit, and a first-order quantized multiplication array unit;

feature multipliers of the eighth-order quantized multiplication array unit are 1, 3, 5, 7, 9, 11, 13, and 15, respectively; feature multipliers of the fourth-order quantized multiplication array unit are 1, 3, 5, and 7, respectively; feature multipliers of the second-order quantized multiplication array unit are 1 and 3, respectively; and a feature multiplier of the first-order quantized multiplication array unit is 1;

feature products of the eighth-order quantized multiplication array unit are 1×Input, 3×Input, 5×Input, 7×Input, 9×Input, 11×Input, 13×Input, and 15×Input; feature products of the fourth-order quantized multiplication array unit are 1×Input, 3×Input, 5×Input, and 7×Input; feature products of the second-order quantized multiplication array unit are 1×Input and 3×Input; and a feature product of the first-order quantized multiplication array unit is 1×Input.

4. The multiply-accumulate calculation circuit suitable for a neural network according to claim 1, wherein the accumulation calculation circuit is composed of a delay accumulation circuit, a TDC conversion circuit, and a shift-addition circuit sequentially connected in series;

the delay accumulation circuit has M groups of input ends and eight groups of output ends; the TDC conversion circuit has eight groups of input ends and eight groups of output ends; the shift-addition circuit has eight groups of input ends and one group of output ends; the M groups of input ends of the delay accumulation circuit are connected to the M groups of output ends of the multiplication calculation circuit array, respectively; the eight groups of output ends of the delay accumulation circuit are connected to the eight groups of input ends of the TDC conversion circuit, respectively; the eight groups of output ends of the TDC conversion circuit are connected to the eight groups of input ends of the shift-addition circuit, respectively; the output end of the shift-addition circuit is the output end of the accumulation calculation circuit.

5. The multiply-accumulate calculation circuit suitable for a neural network according to claim 4, wherein the delay accumulation circuit is a summation array composed of eight independent controllable delay chains; the number of the controllable delay chains is equal to the number of bits of an output product of the multiplication calculation circuit array; any of the controllable delay chains completes one accumulation of data on a certain bit of the M groups of products in a time domain;

each controllable delay chain is formed by sequentially connecting M controllable delay blocks in series; trigger signals of the controllable delay blocks at odd locations are a clock rising edge; and trigger signals of the controllable delay blocks at even locations are a clock falling edge;

each controllable delay block has two input ends and one output end; the first input end is used to receive a time reference signal, and the second input end is connected to one group of output ends in the M groups of input ends of the delay accumulation circuit for receiving data on a certain bit of the M groups of products; and a time signal after a delay amount is superimposed is output from the output end.

6. The multiply-accumulate calculation circuit suitable for a neural network according to claim 5, wherein the multiply-accumulate calculation circuit implements a multiply-accumulate calculation method specifically comprising a multiplication calculation method and an accumulation calculation method, wherein the multiply-accumulate calculation method comprises the following steps:

step 101: performing real-time quantization on the order of multiplication array units in each group of multiplication calculation circuits in an on-chip training mode, and performing actual calculation of a neural network by using an n-th order quantized multiplication array unit;

step 102: providing, in each group of multiplication calculation circuits, by the n-th order quantized multiplication array unit, n feature products to first to eighth selection-shift units as a shared input;

step 103: comparing, in a calculation period in each group of multiplication calculation circuits, by each selection-shift unit, a decimal value of the upper four digits of the weight coefficient and a decimal value of the lower four digits of the weight coefficient with a feature multiplier of the n-th order quantized multiplication array unit respectively, and outputting each group of products, specifically as follows:

step 103-A: when the decimal value of the upper four digits of the weight coefficient is consistent with the feature multiplier and is not 0, directly outputting data of each bit of the corresponding feature product; when the decimal value of the lower four digits of the weight coefficient is consistent with the feature multiplier and is not 0, selecting a corresponding feature product, and directly outputting data of each bit of the corresponding feature product; and proceeding to step 104;

step 103-B: when the decimal value of the upper four digits of the weight coefficient is inconsistent with the feature multiplier and is not 0, performing a shift operation on the feature product, and outputting the data of each bit of the obtained result; when the decimal value of the lower four digits of the weight coefficient is inconsistent with the feature multiplier and is not 0, performing a shift operation on the feature product, and outputting the data of each bit of the obtained result; and proceeding to step 104; and step 103-C: when the decimal value of the upper four digits of the weight coefficient is 0, directly outputting 0; when the decimal value of the lower four digits of the weight coefficient is 0, directly outputting 0; and proceeding to step 104;

step 104: sequentially inputting data on the i bit in the first to M-th groups of products into M controllable delay blocks of the (i+1)-th delay chain, wherein i is any natural number from 0 to 7;

wherein at a trigger signal moment, the controllable delay block outputs different delay amounts according to different values of the input data, specifically as follows: the controllable delay block outputs a delay amount $\Delta t$ when the input data is 0, and the controllable delay block outputs a delay amount $2\Delta t$ when the input data is 1; and at a non-trigger signal moment, the controllable delay block outputs a delay amount $\Delta t$, regardless of the input data of 0 or 1;

step 105: completing, by the (i+1)-th controllable delay chain, one accumulation of data on the i bit in the first to M-th groups of products in a time domain; and when a calculation scale of the neural network exceeds the cascade number M of the controllable delay block, dynamically controlling the number of iterations of each controllable delay chain;

step 106: converting the delay amount output by each controllable delay chain into a decimal digital quantity by using a TDC conversion circuit; and step 107: performing addition and right-shift operations on the digital quantity by using a shift-addition circuit to obtain output data of the neural network.

7. The multiply-accumulate calculation circuit suitable for a neural network according to claim 6, wherein in each group of multiplication calculation circuits, the specific steps of the on-chip training mode are as follows:

step 201: initializing a weight coefficient of the neural network, setting a training data set, and obtaining a pre-trained neural network $NN_0$;

step 202: comprising two simultaneous parts, specifically as follows:

step 202-A: testing the pre-trained neural network $NN_0$ with a testing data set to obtain network initial accuracy A; and step 202-B: initializing a quantization order of the multiplication array unit to a first order, and replacing a standard multiplication calculation circuit in the pre-trained neural network $NN_0$ with a first-order quantized multiplication calculation circuit to obtain a first-order quantized neural network $NN_1$; and training the first-order quantized neural network $NN_1$ with the testing data set to obtain network actual accuracy B;

step 203: introducing a limiting factor Q of network accuracy, and determining the size relationship between B and $A \times Q$; if $B > A \times Q$, then proceeding to step 209; and if $B < A \times Q$, then proceeding to step 204;

step 204: increasing the quantization order of the multiplication array unit to a second order, and replacing the standard multiplication calculation circuit in the pre-trained neural network $NN_0$ with a second-order quantized multiplication calculation circuit to obtain a second-order quantized neural network $NN_2$; and training the second-order quantized neural network $NN_2$ with the testing data set to obtain network actual accuracy B;

step 205: introducing a limiting factor Q of network accuracy, and determining the size relationship between B and $A \times Q$; if $B > A \times Q$, then proceeding to step 209; and if $B < A \times Q$, then proceeding to step 206;

step 206: increasing the quantization order of the multiplication array unit to a fourth order, and replacing the standard multiplication calculation circuit in the pre-trained neural network $NN_0$ with a fourth-order quantized multiplication calculation circuit to obtain a fourth-order quantized neural network $NN_4$; and training the fourth-order quantized neural network $NN_4$ with the testing data set to obtain network actual accuracy B;

step 207: introducing a limiting factor Q of network accuracy, and determining the size relationship between B and A×Q; if B>A×Q, then proceeding to step 209; and if B<A×Q, then proceeding to step 208;

step 208: increasing the quantization order of the multiplication array unit to an eighth order, and replacing the standard multiplication calculation circuit in the pre-trained neural network $NN_0$ with an eighth-order quantized multiplication calculation circuit to obtain an eighth-order quantized neural network $NN_8$, and proceeding to step 209; and step 209: ending the on-chip training of the quantization order of the multiplication array unit, and performing actual calculation on the neural network by using the multiplication array unit of the current quantization order.

8. The multiply-accumulate calculation circuit suitable for a neural network according to claim 6, wherein in each group of multiplication calculation circuits, the shift operation is performed on the feature product in step 103-B according to a quantization order of the multiplication array unit, specifically as follows:

when the quantization order of the multiplication array unit is eighth: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 5×Input is shifted to the left by 1 bit to obtain 10×Input; the feature product 3×Input is shifted to the left by 2 bits to obtain 12×Input; and the feature product 7×Input is shifted to the left by 1 bit to obtain 14×Input;

when the quantization order of the multiplication array unit is fourth: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 3×Input is shifted to the left by 2 bits to obtain 12×Input; the feature product 1×Input is shifted to the left by 2 bits to obtain 4×Input, approximately representing 5×Input; the feature product 3×Input is shifted to the left by 1 bit to obtain 6×Input, approximately representing 7×Input; the feature product 1×Input is shifted to the left by 3 bits to obtain 8×Input, approximately representing 9×Input and 10×Input; and the feature product 3×Input is shifted to the left by 2 bits to obtain 12×Input, approximately representing 11×Input, 13×Input, 14×Input, and 15×Input;

when the quantization order of the multiplication array unit is second: the feature product 1×Input is shifted to the left by 1 bit to obtain 2×Input; the feature product 1×Input is shifted to the left by 2 bits to obtain 4×Input; the feature product 3×Input is shifted to the left by 1 bit to obtain 6×Input; the feature product 1×Input is shifted to the left by 3 bits to obtain 8×Input; the feature product 3×Input is shifted to the left by 2 bits to obtain 12×Input; the feature product 1×Input is shifted to the left by 2 bits to obtain 4×Input, approximately representing 5×Input; the feature product 3×Input is shifted to the left by 1 bit to obtain 6×Input, approximately representing 7×Input; the feature product 1×Input is shifted to the left by 3 bits to obtain 8×Input, approximately representing 9×Input and 10×Input; and the feature product 3×Input is shifted to the left by 2 bits to obtain 12×Input, approximately representing 11×Input, 13×Input, 14×Input, and 15×Input; and when the quantization order of the multiplication array unit is first: the feature product 1×Input is shifted to the left by 1 bit to obtain 2×Input; the feature product 1×Input is shifted to the left by 2 bits to obtain 4×Input; the feature product 1×Input is shifted to the left by 3 bits to obtain 8×Input; the feature product 1×Input is shifted to the left by 1 bit to obtain 2×Input, approximately representing 3×Input; the feature product 1×Input is shifted to the left by 2 bits to obtain 4×Input, approximately representing 5×Input, 6×Input, and 7×Input; and the feature product 1×Input is shifted to the left by 3 bits to obtain 8×Input, approximately representing 9×Input, 10×Input, 11×Input, 12×Input, 13×Input, 14×Input, and 15×Input.

9. The multiply-accumulate calculation circuit suitable for a neural network according to claim 6, wherein the dynamically controlling the number of iterations of each controllable delay chain in step 105 comprises the following specific steps:

step 301: if the calculation scale of the neural network is W, dividing W groups of data into K segments of M groups of data and one segment of N groups of data, wherein K is an integer greater than or equal to 1, and N is an integer greater than or equal to 1 and less than M;

step 302: taking a time signal $Y_{j-1}$ as an input; performing, by each controllable delay chain, a j-th accumulative calculation on the j-th segment of M groups of data, and outputting a time quantity $Y_j=Y_{j-1}+\Delta T_j$, wherein j is a natural number from 1 to K; and step 303: taking a time signal $Y_K$ as an input; and performing, by each controllable delay chain, an accumulative calculation on the N groups of data, and outputting a time quantity $Y=Y_k+\Delta T$.

\* \* \* \* \*